United States Patent
Fujiki et al.

(12) 
(10) Patent No.: US 6,387,520 B1
(45) Date of Patent: May 14, 2002

(54) LIQUID SILICONE RUBBER COATING COMPOSITION AND AIR BAG FABRIC

(75) Inventors: Hironao Fujiki; Yoshifumi Inoue; Yoshifumi Harada; Takeshi Miyao; Masayuki Ikeno, all of Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/644,900

(22) Filed: Aug. 24, 2000

(30) Foreign Application Priority Data

Aug. 24, 1999 (JP) .............................. 11-236456

(51) Int. Cl.$^7$ .......................... B32B 27/38; B32B 9/00; B32B 27/36; B32B 27/34; C08L 83/04

(52) U.S. Cl. .................... 428/447; 428/413; 428/480; 428/474.4; 524/265; 524/731; 524/266; 524/858

(58) Field of Search ............... 428/447, 425.5, 428/402, 413, 480, 474.4; 524/265, 266, 731

(56) References Cited

U.S. PATENT DOCUMENTS

| | | |
|---|---|---|
| 5,401,566 A | 3/1995 | Magee et al. |
| 5,789,084 A | 8/1998 | Nakamura et al. |
| 5,877,256 A | 3/1999 | Nakamura et al. |
| 5,990,223 A * | 11/1999 | DeGroot, Jr. ............... 524/492 |

FOREIGN PATENT DOCUMENTS

| | | |
|---|---|---|
| EP | 0669419 A1 | 8/1930 |
| EP | 0669376 A2 | 8/1995 |
| EP | 0764702 A2 | 3/1997 |
| JP | A6378744 | 4/1988 |
| JP | A3242442 | 10/1991 |
| JP | A790777 | 4/1995 |
| JP | B22571986 | 10/1996 |

OTHER PUBLICATIONS

Okel et al., Mar.–Apr. 1995, Rubber Chemistry and Technology, 68, p. 59–76.*

European Search Report.

* cited by examiner

Primary Examiner—Robert Dawson
Assistant Examiner—Michael J. Feely
(74) Attorney, Agent, or Firm—Birch, Stewart, Kolasch & Birch, LLP

(57) ABSTRACT

A solvent-free liquid silicone rubber composition comprising (A) an organopolysiloxane containing at least two alkenyl groups, (B) an organohydrogenpolysiloxane having at least two hydrogen atoms each attached to a silicon atom, (C) wet silica having a BET specific surface area of 150–250 m$^2$/g, a mean particle size of 0.01–20 μm, and a sodium ion content of up to 0.35 wt % Na$_2$O, (D) an adhesive agent, and (E) a platinum group catalyst is useful for coating onto air bag base fabric to form a thin film having good infiltration, strong adhesion and minimized surface tack.

15 Claims, No Drawings

US 6,387,520 B1

LIQUID SILICONE RUBBER COATING COMPOSITION AND AIR BAG FABRIC

This invention relates to a solventless (or solvent free) liquid silicone rubber coating composition, and more particularly, to a liquid silicone rubber composition which is effectively coated without a need for solvent and suitable as an air bag coating that is resistant to the impact by inflation, especially high temperature inflation. It also relates to an air bag fabric.

BACKGROUND OF THE INVENTION

Air bags are currently installed in many automobiles as the vehicle passenger safety device. The air bags are constructed of base fabric in the form of nylon fabric coated with chloroprene rubber.

The base fabric coated with chloroprene rubber, however, has the drawbacks that weight reduction is difficult and especially, physical properties deteriorate with the lapse of time. JP-A 63-78744, JP-A 3-243442 and Japanese Patent No. 2,571,986 disclose air bag base fabrics coated with silicone rubber compositions. These silicone rubber-coated air bag base fabrics advantageously have improved high-temperature properties. Nevertheless, these silicone rubber compositions have the drawback that upon application to air bag-forming base fabric of synthetic fibers such as nylon 66, an organic solvent for dilution must be used in order to achieve uniform thin coating and a sufficient bond strength to the base fabric. More particularly, to ensure thin film coating and infiltration into the base fabric, the silicone rubber compositions must be diluted with organic solvents such as toluene and xylene.

As a solution to this problem, Japanese Patent No. 2,571,986 discloses a solventless liquid composition comprising a silicone resin having $SiO_4$ units. JP-A 7-90777 corresponding to U.S. Pat. No. 5,401,566 discloses the use of hydrophobic silica as the filler. These proposals still have a problem. When a bonding component is added to the silicone composition in order to provide a firm bond to the base fabric, the silicone composition becomes so thixotropic that it may become difficult to achieve a coating thickness of about 40 μm or less, especially about 20 μm or less, which is currently desired from the standpoints of cost reduction and compactness.

SUMMARY OF THE INVENTION

An object of the invention is to provide a solventless (or solvent free) liquid silicone rubber coating composition which has improved infiltration and adhesion abilities and can be thinly coated, without a need for solvent, to form a coating film having minimized surface tack, and which is especially suited for coating on air bag-forming synthetic fiber fabric. Another object is to provide an air bag fabric having a coating film of the composition.

The invention pertains to a liquid silicone rubber coating composition comprising an organopolysiloxane containing at least two alkenyl groups in a molecule, an organohydrogenpolysiloxane having at least two hydrogen atoms each attached to a silicon atom (that is, at least two SiH groups) in a molecule, wet silica, an adhesive agent, and a platinum group catalyst. It has been found that when a wet silica having a specific surface area of 150 to 250 m²/g on average as measured by the BET method, a mean particle size (secondary particles) of up to 20 μm, and a sodium ion content of up to 0.35% by weight calculated as $Na_2O$ is used as the wet silica, the composition has good infiltration and thin film coating abilities to air bag-forming synthetic fiber fabrics, even in the absence of solvent, and forms a coating having minimized surface tack and a high bond strength.

According to the invention, there is provided a solventless (or solvent free,) liquid silicone rubber coating composition comprising (A) an organopolysiloxane containing at least two alkenyl groups in a molecule,
(B) an organohydrogenpolysiloxane having at least two hydrogen atoms each attached to a silicon atom in a molecule,
(C) wet silica having a specific surface area of 150 to 250 m²/g on average as measured by the BET method, a mean particle size of up to 20 μm, and a sodium ion content of up to 0.35% by weight calculated as $Na_2O$,
(D) a bonding component, and
(E) a platinum group catalyst.

An air bag fabric having formed thereon a coating film of the composition is also contemplated.

DESCRIPTION OF THE PREFERRED EMBODIMENT

The organopolysiloxane (A) is a base component (or base polymer) of the composition. It must have at least two alkenyl groups attached to silicon atoms in a molecule in order that the composition form a silicone rubber coating film having rubbery elasticity upon curing.

Preferred is an organopolysiloxane having on the average at least two alkenyl groups attached to silicon atoms in a molecule, represented by the following average compositional formula (1):

$$R^1_a SiO_{(4-a)/2} \qquad (1)$$

wherein $R^1$ is a substituted or unsubstituted monovalent hydrocarbon group, 0.01 to 10 mol % of $R^1$ being preferably alkenyl groups, and "a" is a positive number of 1.9 to 2.4.

$R^1$ stands for substituted or unsubstituted monovalent hydrocarbon groups of 1 to 12 carbon atoms, especially 1 to 8 carbon atoms, attached to silicon atoms. Examples include alkyl groups such as methyl, ethyl, propyl, isopropyl, butyl, isobutyl, tert-butyl, pentyl, neopentyl, hexyl heptyl, octyl, nonyl, decyl and dodecyl; cycloalkyl groups such as cyclopentyl, cyclohexyl and cycloheptyl; alkenyl groups such as vinyl, allyl, propenyl, isopropenyl, butenyl, isobutenyl, hexenyl and cyclohexenyl; aryl groups such as phenyl, tolyl, xylyl, naphthyl and biphenyl; aralkyl groups such as benzyl, phenylethyl, phenylpropyl and methylbenzyl; and substituted ones of the foregoing groups in which some or all of the hydrogen atoms are replaced by halogen atoms (e.g., F, Cl and Br) or cyano groups, such as chloromethyl, 2-bromoethyl, 3,3,3-trifluoropropyl, 3-chloropropyl and cyanoethyl.

The organopolysiloxane favors that methyl accounts for at least 90 mol % (usually 90 to 90.99 mol %, preferably 95 to 99.98 mol %) of the substituted or unsubstituted monovalent hydrocarbon groups represented by $R^1$. Also, at least two groups of the entire $R^1$ groups on the average should be alkenyl groups. It is preferred that 0.01 to 10 mol % and more preferably 0.02 to 5 mol % of the entire $R^1$ groups be alkenyl groups. Outside the range, a lower proportion of alkenyl may result in a composition which is poorly curable whereas a high proportion of alkenyl may result in a composition having poor physical properties including tensile strength, tear strength and elongation after curing. The alkenyl group may be attached to a silicon atom either at the end or at an intermediate of a molecular chain or both. The preferred alkenyl group is vinyl. The preferred groups other than methyl and vinyl groups are phenyl and 3,3,3-trifluoropropyl.

In formula (1), "a" is a positive number of 1.9 to 2.4 and preferably 1.95 to 2.05. The molecular structure of the organopolysiloxane is preferably a linear one consisting essentially of recurring diorgnosiloxane units (i.e., $R^1_2SiO_{2/2}$ unit) and further preferably, having alkenyl groups at both ends of the molecular chain although a branched structure partially containing $R^1SiO_{,3/2}$ units or $SiO^{4/2}$ units is acceptable. It is noted that the organopolysiloxane is preferably end-blocked with a triorganosiloxy group (i.e., $R^1_3SiO_{1/2}$ group) such as trivinylsiloxy, methyldivinylsiloxy, dimethylvinylsiloxy or trimethylsiloxy.

The organopolysiloxane preferably has a viscosity of at least about 100 centipoise at 25° C., and typically about 100 to 50,000centipoise at 25° C. When the strength of a silicone rubber coating film and ease of blending operation are taken into account, the more preferred viscosity is about 400 to 10,000 centipoise at 25° C., and especially about 500 to 5,000 centipoise at 25° C.

Illustrative examples of the organopolysiloxane (A) are both end dimethylvinylsiloxy blocked dimethylpolysiloxane, both end dimethylvinylsiloxy blocked dimethylsiloxane-methylvinylsiloxane copolymers, and both end dimethylvinylsiloxy blocked dimethylsiloxane-methylphenylsiloxane copolymers.

In the inventive composition, (B) an organohydrogenpolysiloxane is blended as a curing or crosslinking agent for the alkenyl group-containing organopolysiloxane or base polymer (A). The organohydrogenpolysiloxane acts as the crosslinking agent. More particularly, hydrosilylation addition reaction occurs between alkenyl groups attached to silicon atoms in the base polymer and hydrogen atoms attached to silicon atoms (i.e., SiH groups) in the organohydrogenpolysiloxane in the presence of a catalyst whereby the base polymer is crosslinked and cured. The organohydrogenpolysiloxane should have at least two, preferably at least three, hydrogen atoms each attached to a silicon atom (that is, SiH groups) in a molecule. It is preferably liquid at room temperature and represented by the following average compositional formula (2):

$$R^2_b H_c SiO_{(4-b-c)/2} \qquad (2)$$

wherein $R^2$ is a substituted or unsubstituted monovalent hydrocarbon group of 1 to 10 carbon atoms, b is a positive number of 0.7 to 2.1, c is a positive number of 0.001 to 1.0, and b+c is 0.8 to 3.0.

In formula (2), $R^2$ stands for substituted or unsubstituted monovalent hydrocarbon groups of 1 to 10 carbon atoms, especially 1 to 8 carbon atoms, examples of which are the same as exemplified above for $R^1$, preferably those groups free of aliphatic unsaturation. The preferred hydrocarbon groups represented by $R^2$ are alkyl, aryl, aralkyl, and substituted alkyl groups, for example, methyl, ethyl, propyl, phenyl and 3,3,3-trifluoropropyl. Letter b is a positive number of $0.7 \leq b \leq 2.1$, preferably $1 \leq b \leq 2$, c is a positive number of $0.001 \leq c \leq 1.0$, preferably $0.01 \leq c \leq 1.0$, and b+c is $0.8 \leq b+c \leq 3.0$, preferably $1 \leq b+c \leq 2.4$. The molecular structure may be any of linear, cyclic, branched and three-dimensional network structures. The SiH groups may be attached at ends or intermediates of a molecular chain or both. Although the molecular weight is not critical, the organohydrogenpolysiloxane preferably has a viscosity of about 0.2 to 1,000 centipoise at 25° C., especially about 1 to 500 centipoise at 25° C.

Illustrative, non-limiting, examples of the organohydrogenpolysiloxane (B) include 1,1,3,3-tetramethyl-disiloxane, methylhydrogen cyclic polysiloxane, methylhydrogensiloxane-dimethylsiloxane cyclic copolymers, both end trimethylsiloxy group-blocked methylhydrogen-polysiloxane, both end trimethylsiloxy group-blocked dimethylsiloxane-methylhydrogensiloxane copolymers, both end dimethylhydrogensiloxy group-blocked dimethylpolysiloxane, both end dimethylhydrogensiloxy group-blocked dimethylsiloxane-methylhydrogensiloxane copolymers, both end trimethylsiloxy group-blocked methylhydrogensiloxane-diphenylsiloxane copolymer, both end trimethylsiloxy group-blocked methylhydrogensiloxane-diphenylsiloxane-dimethylsiloxane copolymers, copolymers composed of $(CH_3)_2HSiO_{1/2}$ units and $SiO_{4/2}$ units, copolymers composed of $(CH_3)_2HSiO_{1/2}$ units, $(CH_3)_3SiO_{1/2}$ units and $SiO_{4/2}$ units, and copolymers composed of $(CH_3)_2HSiO_{1/2}$ units, $SiO_{4/2}$ units and $(C_6H_5)_3SiO_{1/2}$ units.

Of the foregoing examples, those copolymers in which $CH_3(H)SiO$ units account for at least one half (50 mol %) of the entire siloxane units are confirmed to be effective in improving the adhesion to the base fabric, when combined with the bonding component (D) to be described later.

In the inventive composition, (C) wet silica is blended. The wet silica, that is, silica synthesized by a wet method (e.g., precipitated silica), is generally used as a filler for silicone rubber. Since the composition of the invention is intended for use in a coating application, especially an air bag fabric coating application, the wet silica used herein should have a specific surface area of 150 to 250 $m^2/g$ on average as measured by the BET method, a mean particle size of up to 20 μm, and a sodium ion content of up to 0.35% by weight calculated as $Na_2O$.

Where wet silica is used as the main filler, it should have a BET specific surface area of 150 to 250 $m^2/g$ on average in order that the composition form a solventless (solvent free) liquid system. Below 150 $m^2/g$, physical strength is lost. Above 250 $m^2/g$, the composition becomes too viscous to form a thin coating of less than 40 μm. Wet silica with a BET specific surface area in the range of 150 to 250 $m^2/g$ provides the composition with an appropriate viscosity to coating and has another characteristic feature that unlike the use of dry silica such as fumed silica, the wet silica prevents the composition from increasing its thixotropy substantially even when the adhesive agent (D) is added, that is, ensures both the desired coating and bonding abilities without a concomitant rise of viscosity.

In order to accomplish a coating thickness of not greater than about 40 μm. preferably not greater than 20 μm, which is desired for the air bag fabric coating, the wet silica should have a mean particle size of up to 20 μm, and preferably up to 10 μm. The lower limit of the mean particle size is not critical although the mean particle size is usually at least 0.01 μm and especially at least 0.1 μm. It is noted that the mean particle size refers to the size of secondary particles because primary particles of wet silica are extremely fine and actually agglomerate into secondary particles or agglomerates. The mean particle size (i.e., the average particle size) is generally determined as a weight mean diameter (i.e., a weight average diameter) or median diameter ($D_{50}$) measured by the laser light diffraction method.

While the composition is often applied onto air bag base fabric, the air bag is required to have a flame-out function. As is well known in the art, wet silica is generally prepared from sodium silicate and sodium ions are left behind as an impurity. If wet silica contaminated with sodium ions is blended in a silicone rubber composition, the composition becomes less flame retardant. In order to insure flame retardance while maintaining the characteristics of wet silica, the sodium ion content of wet silica should be reduced silicon atom-attached hydrogen atoms, etc. are preferred examples.

Illustrative examples of the epoxy group-containing compounds are given below.

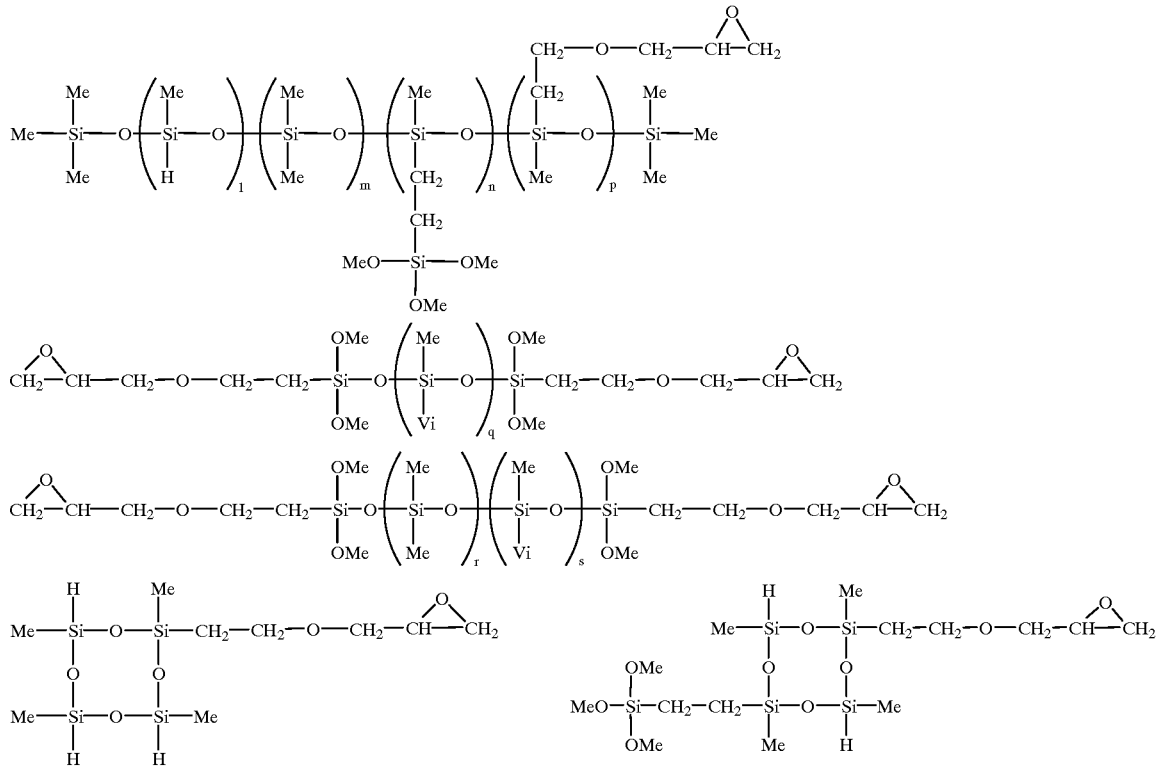

to 0.35% by weight or less, especially 0.30% by weight or less, calculated as $Na_2O$.

In the inventive composition, (D) an adhesive agent is blended for improving the adhesion of the composition to air bag base fabric of synthetic fibers. Depending on whether the base fabric is made of nylon or polyester fibers, the adhesive agent differs. For the nylon base fabric, compounds containing epoxy groups such as glycidyl groups, for example, epoxy group-containing organoalkoxysilanes such as γ-glycidoxypropyltrimethoxysilane, γ-glycidoxypropylmethyldiethoxysilane, and 3,4-epoxycyclohexylethyltrimethoxysilane; epoxy group-containing organopolysiloxanes such as epoxy group-containing organopolysiloxanes having silicon atom-attached vinyl groups and alkoxy groups, epoxy group-containing organopolysiloxanes having silicon atom-attached hydrogen atoms, and epoxy group-containing organopolysiloxanes having silicon atom-attached hydrogen atoms and alkoxy groups; ester or ether compounds containing (meth)acryloxy or alkenyl group and epoxy group such as glycidyl (meth) acrylate, allyl glycidyl ether, etc. are effective for enhancing adhesion.

For the polyester base fabric, alkoxysilanes containing (meth)acryloxy group or alkanyl group such as γ-(meth) acryloxypropyltrimethoxysilane, vinyltrialkoxysilane or siloxanes which are partial hydrolyzates of these silanes, silanes or siloxanes having silicon atom-attached hydrogen atoms and alkoxysilyl groups, compounds having a phenyl skeleton such as phenyl group or phenylene group and Note that l,m,n,p,q,r and s each are an integer of 1 to 10, Me is methyl and Vi is vinyl.

The inventive composition further contains (E) an addition reaction (i.e., hydrosilylation reaction) catalyst which may be selected from among platinum group metals in element form and compounds and complexes containing platinum group metals as the catalyst metal. Illustrative examples include platinum catalysts such as platinum black, platinum chloride, chloroplatinic acid, reaction products of chloroplatinic acid with monohydric alcohols, complexes of chloroplatinic acid with olefins, complexes of chloroplatinic acid with vinylsiloxanes, and platinum bisacetoacetate; palladium catalysts such as tetrakis(triphenylphosphine) palladium and dichlorobis(triphenylphosphine)palladium; and rhodium catalysts such as chlorotris (triphenylphosphine)rhodium and tetrakis (triphenylphosphine)rhodium.

If desired, (F) an alkenyl group-containing silicone resin which is soluble to a silicone oil (e.g., dimethylpolysiloxane) is blended in the inventive composition for the purpose of improving the cured physical properties such as tensile strength and tear strength. It is a silicone oil-soluble, alkenyl group-containing, three-dimensional network silicone resin basically containing $R^1SiO_{3/2}$ units and/or $SiO_{4/2}$ units and optionally at least one of $R^1{}_3SiO_{1/2}$ units and $R^1{}_2SiO_{2/2}$ units wherein $R^1$ is as defined above.

The formulation of the respective components is described below where all parts are parts by weight. An appropriate amount of the organohydrogenpolysiloxane (B)

blended is about 0.1 to 50 parts, and especially about 1 to 20 parts per 100 parts of the organopolysiloxane (A); an appropriate amount of the wet silica (C) blended is about 1 to 30 parts, and especially about 3 to 20 parts per 100 parts of the organopolysiloxane (A); and an appropriate amount of the adhesive agent (D) blended is about 0.1 to 30 parts, and especially about 0.1 to 5 parts per 100 parts of the organopolysiloxane (A). An appropriate amount of the silicone resin (F) blended is 0 to about 50 parts, and especially 0 to about 30 parts per 100 parts of the organopolysiloxane (A). Also, the molar ratio of the entire SiH groups to the entire alkenyl groups in the composition, that is, the molar ratio of silicon atom-attached hydrogen atoms (SiH groups) in component (B) (and component (D) as the case may be) to silicon atom-attached alkenyl groups in component (A) (and components (D) and (F) as the case may be) should preferably range from 0.9 to 20, and especially from 0.9 to 5. The total number of silicon atom-attached alkenyl groups per molecule in component (A) and SiH groups per molecule in component (B) is preferably 5 or greater. Component (E) is added in such amounts that 0.1 to 500 ppm, especially 1 to 50 ppm of platinum group metal may be available based on the weight of component (A). Less than 0.1 ppm of the platinum group metal is insufficient for reaction to proceed whereas more than 500 ppm of the platinum group metal is uneconomical.

In addition to the above-described components (A) to (F), the inventive composition may further contain a reaction controlling agent which is selected from alkyne alcohols such as 3-methyl-1-butyn-3-ol, 3,5-dimethyl-1-hexyn-3-ol and phenyl butynol; ene-yne compounds such as 3-methyl-3-penten-1-yne and 3,5-dimethyl-3-hexen-1-yne; tetramethyltetrahexenylcyclotetrasiloxane and benzotriazole. Also if necessary, various other additives such as pigments, heat resistance modifiers, and flame retardance modifiers may be blended insofar as the objects of the invention are not impaired. Exemplary such additives are titanium dioxide, $Fe_2O_3$, $Fe_3O_4$, carbon black, cerium oxide, and cerium hydroxide, which are generally considered useful in silicone rubbers. The inventive composition can be readily prepared by blending the essential and optional components, and uniformly kneading them in a suitable mixer such as a kneader mixer, pressure kneader mixer or Ross mixer.

Since the inventive composition is used as a solventless system, it should preferably have a viscosity of about 500 to 80,000 centipoise at 25° C., and especially about 1,000 to 10,000 centipoise at 25° C.

The liquid silicone rubber composition of the invention is typically applied onto an air bag base fabric of synthetic fibers and heat cured thereto in a hot air dryer, obtaining a coated air bag fabric. When the liquid silicone rubber composition is applied to an air bag base fabric of synthetic fibers, the liquid fully infiltrates into the base fabric and forms a uniform thin coating. The coverage of the silicone rubber composition on the base fabric is preferably up to about 40 g/m², more preferably about 5 to 40 g/m², and especially about 10 to 30 g/m². Upon heat curing, the coating turns to a silicone rubber coating film which is fully flexible and firmly and integrally bonded to the synthetic fibers of the base fabric. This coating film has a sufficiently high bond strength to withstand a Scott flexing test and complies with a flame retardant test. The air bag fabric coated with the inventive composition undergoes no degradation at folds when it is closely folded and accommodated as an air bag. The silicone rubber coating film is not separated from the base fabric by rigorous marring upon inflation of the air bag.

Examples of the air bag-forming synthetic fiber woven fabric used herein include polyamide fiber fabrics such as nylon 6, nylon 66 and nylon 46, aramid fiber fabrics, polyester fiber fabrics such as polyalkylene terephthalate, polyether imide fiber fabrics, sulfone fiber fabrics, and carbon fiber fabrics. Of these, nylon 66 fiber fabrics are most preferred.

The coating method is not critical. The curing conditions after coating include 150 to 200° C. and ½ to 3 minutes, and especially 150 to 200° C. and 30 to 80 seconds.

The liquid silicone rubber composition of the invention is applicable without a need for a diluting solvent because of improved infiltration, adhesion and thin coating ability and forms on a fabric a thin film having minimized surface tack. The composition is useful as a coating composition for use in the air bag application.

EXAMPLE

Examples of the invention are given below by way of illustration and not by way of limitation. In Examples, wet silica used is precipitated silica, all parts are by weight, and the viscosity is a measurement at 25° C., expressed in centipoise (cp). In Examples, "wt %" means "% by weight". Me is methyl and Vi is vinyl.

Example 1

In a Ross mixer, 100 parts of dimethylpolysiloxane blocked with dimethylvinylsiloxy groups at both ends of its molecular chain and having a viscosity of 1,500 cp was mixed with 19 parts of wet silica A (specific surface area 190 m²/g, mean particle size 10 μm, Na ion content 0.16 wt % as $Na_2O$), and 2 parts of a dimethylhydroxysilyl end-blocked dimethylpolysiloxane having an average siloxane unit number of 20 until uniform. The mixture was then heat treated up to 150° C. in vacuum, obtaining a liquid silicone base having fluidity. To 100 parts of this liquid silicone base were added 5.2 parts of methylhydrogenpolysiloxane represented by the average molecular formula:

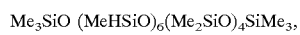

$Me_3SiO(MeHSiO)_6(Me_2SiO)_4SiMe_3$, 0.4 part of the complex of chloroplatinic acid with divinyltetramethyldisiloxane (platinum concentration 0.4 wt %), 0.3 part of 3,5-dimethyl-1-hexyn-3-ol as a cure controlling agent, and 1 part of γ-glycidoxypropyl-trimethoxysilane as an adhesive agent. They were uniformly mixed into a liquid silicone rubber composition for coating. This composition had a viscosity of 4,500 cp.

Next, the composition was coated onto a nylon 66 fiber woven fabric (210 deniers) and heated at 180° C. for one minute for curing. With respect to the coating method, the liquid silicone rubber composition was uniformly coated by means of a knife coater, in a permissible minimum coverage to ensure even coating. By heat curing in an oven at 180° C. for one minute, a silicone rubber-coated fabric was obtained. The coated fabric was examined by the following tests.

Scott Flexing Test

Using a Scott flexing tester, the coated fabric was flexed 1,000 strokes at a pressing force of 2 kgf. The separation of the silicone rubber coating thin film from the fabric surface was visually inspected.

Tack

The silicone rubber coating film was examined for tack by touching its surface with fingers.

Flame Retardance

By a FMVSS302 burning test, the coated fabric was examined for flame retardance.

Infiltration

The air bag-forming synthetic fiber fabric was cut into a strip of 2 cm wide and 10 cm long. The strip was hung vertically and its lower end portion of 0.5 mm was immersed into the liquid silicone rubber composition. The strip was then allowed to stand in this condition for 24 hours at room temperature, following which the distance by which the liquid silicone rubber composition had infiltrated into the base fabric was measured.

The results are shown in Table 1.

Example 2

To 106.9 parts of the liquid silicone rubber composition prepared in Example 1 was added 10 parts of a vinyl-containing methylpolysiloxane resin composed of $Vi(Me)_2SiO_{1/2}$ units, $Me_3SiO_{1/2}$ units and $SiO_{4/2}$ units (Vi group content 5.5 wt %, the ratio of $Vi(Me)_2SiO_{1/2}+Me_3SiO_{1/2}$ units to $SiO_{4/2}$ units is 0.85). They were uniformly mixed into a liquid silicone rubber coating composition. The composition was coated onto a nylon 66 fiber woven fabric (210 deniers) and heated at 180° C. for one minute for curing. The coated fabric was examined by the same tests as in Example 1, with the results shown in Table 1.

Comparative Example 1

A liquid silicone rubber coating composition was prepared as in Example 1 except that 19 parts of wet silica B (specific surface area 120 m²/g, mean particle size 15 μm, Na ion content 0.46 wt % as $Na_2O$) was used instead of wet silica A. The composition was coated onto a nylon 66 fiber woven fabric (210 deniers) and heated at 180° C. for one minute for curing. The coated fabric wag examined by the same tests as in Example 1, with the results shown in Table 1.

Comparative Example 2

To 106.9 parts of the liquid silicone rubber composition prepared in Comparative Example 1 was added 10 parts of a vinyl-containing methylpolysiloxane resin composed of $Vi(Me)_2SiO_{,1/2}$ units, $Me_3SiO_{1/2}$ units and $SiO_{4/2}$ units (Vi group content 5.5 wt %, the ratio of $Vi(Me)_2SiO_{1/2}+Me_3SiO_{1/2}$ units to $SiO_{4/2}$ units is 0.85.). They were uniformly mixed into a liquid silicone rubber coating composition.

The composition was coated onto a nylon 66 fiber woven fabric (210 deniers) and heated at 180° C. for one minute for curing. The coated fabric was examined by the same tests as in Example 1, with the results shown in Table 1.

TABLE 1

|  | E1 | E2 | CE1 | CE2 |
|---|---|---|---|---|
| Minimum coverage (g/m²) | 23 | 24 | 26 | 29 |
| Scott flexing test | passed | passed | passed | passed |
| Tack | tack-free | tack-free | tack-free | tacky |
| Burning test | passed | passed | rejected | rejected |
| Infiltration (cm) | 2.5 | 2.4 | 2.4 | 2.3 |

Example 3

In a Ross mixer, 100 parts of dimethylpolysiloxane blocked with dimethylvinylsiloxy groups at both ends of its molecular chain and having a viscosity of 600 cp was mixed with 11 parts of wet silica C (specific surface area 186 m²/g, mean particle size 14 μm, Na ion content 0.29 wt % as $Na_2O$), 5 parts of hexamethyldisilazane as a silica surface treating agent, and 2 parts of water until uniform. The mixture was then heat treated up to 150° C. in vacuum, obtaining a liquid silicone base having fluidity. To 100 parts of this liquid silicone base were added 6.2 parts of methylhydrogenpolysiloxane represented by the average molecular formula:

$Me_3SiO(MeHSiO)_{20}SiMe_3$, 0.35 part of the complex of chloroplatinic acid with divinyltetramethyldisiloxane (platinum concentration 0.4 wt %), 0.3 part of 3-methyl-1-butyn-3-ol as a cure controlling agent, and 1 part of 3,4-epoxycyclohexylethyltrimethdxysilane as an adhesive agent. They were uniformly mixed into a liquid silicone rubber composition for coating. This composition had a viscosity of 1,600 cp.

As in Example 1, the composition was coated onto a nylon 66 fiber woven fabric (210 deniers) and heat cured, following which the coated fabric was examined by the same tests as in Example 1. The results are shown in Table 2.

Comparative Example 3

A liquid silicone rubber coating composition was prepared as in Example 3 except that 19 parts of wet silica D (specific surface area 270 m²/g, mean particle size 14 μm, Na ion content 0.39 wt % as $Na_2O$) was used instead of wet silica C. The composition was coated onto a nylon 66 fiber woven fabric (210 deniers) and heated at 180° C. for one minute for curing. The coated fabric was examined by the same tests as in Example 1, with the results shown in Table 2.

Comparative Example 4

A liquid silicone rubber coating composition was prepared as in Example 3 except that dry silica (fumed silica Aerosil 200 by Nippon Aerosil K.K.) was used instead of wet silica C. The composition became thickened. The composition was coated onto a nylon 66 fiber woven fabric (210 deniers), but could not form a thin film. The coated fabric was examined by the same tests as in Example 1, with the results shown in Table 2.

TABLE 2

|  | E3 | CE3 | CE4 |
|---|---|---|---|
| Minimum coverage (g/m²) | 20 | 24 | 105 |
| Scott flexing test | passed | passed | passed |
| Tack | tack-free | tack-free | tacky |
| Burning test | passed | rejected | passed |
| Infiltration (cm) | 2.9 | 2.8 | 1.9 |

Example 4 & Comparative Example 5

Liquid silicone rubber compositions of Example 4 and Comparative Example 5 were prepared as in Example 3 and Comparative Example 3, respectively, except that γ-(meth) acryloxypropyltrimethoxysilane was used instead of 3,4-epoxycyclohexylethyltrimethoxysilane as the adhesive agent. As in Example 1, these compositions were coated onto polyester fiber woven fabrics (210 deniers), obtaining silicone rubber-coated fabrics, which were examined by the same tests as in Example 1. The results are shown in Table 3.

TABLE 3

|  | E4 | CE5 |
|---|---|---|
| Minimum coverage (g/m$^2$) | 22 | 25 |
| Scott flexing test | passed | passed |
| Tack | tack-free | tack-free |
| Burning test | passed | rejected |
| Infiltration (cm) | 3.1 | 3.0 |

Japanese Patent Application No. 11-236456 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A solvent-free liquid silicone rubber coating composition comprising
   (A) an organopolysiloxane containing at least two alkenyl groups in a molecule,
   (B) an organohydrogenpolysiloxane having at least two hydrogen atoms each attached to a silicon atom in a molecule,
   (C) wet silica having a specific surface area of 150 to 250 m$^2$/g on average as measured by the BET method, a mean particle size of up to 20 μm, and a sodium ion content of up to 0.35% by weight calculated as Na$_2$O,
   (D) an adhesive agent, and
   (E) a platinum group catalyst.

2. The composition of claim 1 further comprising (F) a silicone oil-soluble alkenyl group-containing silicone resin.

3. The composition of claim 2, wherein silicon resin (F) contains R$^1$SiO$_{1.5}$ units and SiO$_2$ units wherein R$^1$ is methyl, phenyl, 3,3,3-trifluoropropyl, or vinyl.

4. The composition of claim 2, wherein a molar ratio of silicon atom-attached hydrogen groups in components (B) and (D) to silicon atom attached alkenyl groups in components (A), (D), and (F) is from 0.9 to 5.

5. The composition of claim 1, wherein organopolysiloxane (A) is represented by the formula R$^1_a$SiO$_{(4-a)/2}$, wherein "a" is a positive number of 1.95 to 2.05 and R$^1$ is methyl, phenyl, 3,3,3-trifluoropropyl, or vinyl, with 0.02 to 5 mol % of the entirety of the R$^1$ groups being vinyl.

6. The composition of claim 1, wherein organopolysiloxane (A) has a viscosity of about 500 to 5000 centipoise at 25° C.

7. The composition of claim 1, wherein organohydrogenpolysiloxane (B) is represented by the formula R$^2_b$H$_c$SiO$_{(4-b-c)/2}$, wherein $1 \leq b \leq 2$, $0.01 \leq c \leq 1.0$, and $1 \leq b+c \leq 2.4$, and R$^2$ is methyl, ethyl, propyl, phenyl, or 3,3,3,-trifluoropropyl.

8. The composition of claim 1, wherein organohydrogenpoly-siloxane (B) has a viscosity of about 1 to 500 centipoise at 25° C.

9. The composition of claim 1, wherein wet silica (C) has a particle size of from 0.1 μm to 10 μm and a sodium ion content of 0.30% by weight or less.

10. The composition of claim 1, wherein platinum group catalyst (E) is a platinum, palladium, or rhodium catalyst.

11. The composition of claim 1, containing 0.1 to 5 parts by weight of adhesive agent (D), 3 to 20 parts by weight of wet silica (C), and 1 to 20 parts by weight of organohydrogenpolysiloxane (B), all per 100 parts by weight of organopolysiloxane (A).

12. The composition of claim 1, having a viscosity of about 1000 to 10,000 centipoise at 25° C.

13. A nylon air bag fabric having formed thereon a coating film of the composition of claim 1, in which adhesive agent (D) contains epoxy groups.

14. A polyester air bag fabric having formed thereon a coating film of the composition of claim 1, in which adhesive agent (D) is an alkoxysilane containing olefinic unsaturation or a silane having a silicon atom-attached hydrogen atom.

15. An air bag fabric having formed thereon a coating film of the composition of claim 1.

* * * * *